UNITED STATES PATENT OFFICE.

WILLIAM DALRYMPLE BORLAND, OF LONDON, ENGLAND.

DYNAMITE.

SPECIFICATION forming part of Letters Patent No. 443,035, dated December 16, 1890.

Application filed December 12, 1887. Serial No. 257,684. (No specimens.) Patented in England January 18, 1886, No. 758.

*To all whom it may concern:*

Be it known that I, WILLIAM DALRYMPLE BORLAND, analytical and consulting chemist, a subject of the Queen of Great Britain, and a resident of London, England, have invented new and useful Improvements in Explosive Substances and Absorbent Materials Therefor, (for which I have obtained a patent in Great Britain, No. 758, bearing date the 18th day of January, 1886,) of which the following is a specification.

The chief advantage attendant upon the use of charcoal as an absorbent for liquid nitro-compound explosives is that the liquid cannot be separated from the absorbent by contact with water. The chief disadvantages attendant upon such use of charcoal are that even the most porous forms of charcoal heretofore known cannot absorb more than from five to six times their weight of nitro-glycerine and other liquid nitro compounds in proportion to their specific gravity. To exert even this degree of absorption it is necessary that the charcoal be in such a coarse state of comminution that the mixture is not plastic. A consequence of the necessarily large proportion of charcoal used is that the gases produced by explosion contain much carbonic oxide.

The object of this invention is to provide a carbonaceous absorbent in such a fine state of division that the mixture of this and the liquid nitro compound may be perfectly plastic, and yet sufficiently dry, and also one which can take up a larger amount of the liquid nitro compound than those hitherto known.

To carry this invention into effect I take, preferably, cork-waste or any form of cork, divide the same into small pieces, and I either allow it to burn rapidly with free access of air and with abundance of space to permit of all possible swelling up, or I cause it to smoulder in heaps or pits or char it by means of superheated steam or by heated gases—such, for example, as producer gas as it passes from the generator. The product obtained is very easily inflammable, exquisitely soft to the touch, and easily crumbled down to an almost impalpable powder of a reddish-brown to dark-brown color, according to the temperature at which the charring was effected. When properly prepared, this carbonaceous substance readily absorbs from seven to eight times its weight of nitro-glycerine, giving a pulverulent mixture. It may be made to absorb from ten to twelve times its weight, giving a plastic clay-like mass, and it is capable of absorbing as much as thirty to thirty-five times its weight and yielding a stiff paste of homogeneous character from which no nitro-glycerine separates, even after many months' immersion in water.

The mixture of seven to eight parts of nitro-glycerine with one part of the above-described carbonaceous substance is excellent and convenient for use, and is readily molded into cartridges or other desired forms. Moreover, dynamite cartridges may be safely made by molding this mixture under water into the forms or masses required. By the incorporation therewith of one-fourth its weight of water, which may be easily effected by kneading, it becomes absolutely uninflammable, but in that state may be properly exploded by the use of a sufficiently powerful detonator.

The manipulation into cartridges of this uninflammable dynamite is easy and safe, since, in addition to the security provided by its non-inflammability, I have also found that when the pressure of the plunger is applied no nitro-glycerine can be caused to exude until all the water be squeezed out. Moreover, if the mold and plunger be kept wet it is impossible for any of the dynamite to adhere to the sides and bottom thereof and give rise to accidents, such as have been known to occur by the friction of a particle of dynamite between the sides of the plunger and the mold.

I have also found by experiment that while mixtures containing from twenty to thirty parts of nitro-glycerine to one of the carbonaceous substance are not sufficiently hard and dry to form good cartridges an addition of kieselguhr or other equivalent absorbent—magnesia, for instance—obviates this lack of hardness. Thus a mixture of seventy-five parts of nitro-glycerine, three parts of the carbonaceous substance, two parts of alkaline carbonate, and twenty parts of kieselguhr is extremely dry to the touch, is less affected by freezing and thawing than ordinary kieselguhr dynamite, and may be immersed in water for an indefinite length of time without showing signs of exudation. By moistening the kieselguhr or equivalent absorbent with its own weight of water previous to incorporation with the nitro-glycerine admixed with the carbonaceous substance I obtain an uninflammable dynamite dry to the touch and easily molded into cartridges this operation being rendered by the use of this material, practically devoid of danger. The properties of resistance to the action of water and cold thus imparted to ordinary kieselguhr dynamite by the addition of a comparatively minute amount of my carbonaceous substance I regard as most important.

I also find that an efficient explosive may be made by combining carbonized cork with other liquid nitro-explosives than nitro-glycerine, and as I am the first, so far as I am aware, to employ carbonized or charred cork as an absorbent for liquid explosives I do not limit my claims to an explosive consisting of nitro-glycerine and carbonized cork, although this specific compound is preferred.

What I claim is—

1. An explosive consisting of a liquid nitro explosive and charred or carbonized cork in which the liquid explosive is absorbed.

2. An explosive consisting of nitro-glycerine and carbonized or charred cork in which the nitro-glycerine is absorbed.

3. An explosive consisting of nitro-glycerine, carbonized or charred cork, and water.

In testimony whereof I have hereunto signed my name in the presence of two subscribing witnesses.

WILLIAM DALRYMPLE BORLAND.

Witnesses:
  WALTER J. SKERTEN,
  HERBERT E. DALE.
*Both of 17 Gracechurch Street, London, E. C.*